United States Patent [19]
Kawai et al.

[11] Patent Number: 5,355,441
[45] Date of Patent: Oct. 11, 1994

[54] PRINTING CONTROL APPARATUS

[75] Inventors: Sunao Kawai, Nagoya; Hiroyuki Sasaki, Gamagori; Hiroshi Sumiya, Nagoya; Kousuke Fukaya, Kariya; Yoshiyuki Ban, Chita; Ryohei Komiya, Nagoya, all of Japan

[73] Assignee: Brother Kogyo Kabushiki Kaisha, Nagoya, Japan

[21] Appl. No.: 185,219

[22] Filed: Jan. 24, 1994

Related U.S. Application Data

[63] Continuation of Ser. No. 997,091, Dec. 29, 1992, abandoned.

[30] Foreign Application Priority Data

Feb. 18, 1992 [JP] Japan .................................. 4-30866

[51] Int. Cl.$^5$ .............................................. G06F 15/00
[52] U.S. Cl. .................................... 395/115; 395/164
[58] Field of Search ................. 395/112, 114–116, 395/164–166, 425; 400/61, 62, 70, 76; 358/404, 444; 346/154, 150

[56] References Cited

U.S. PATENT DOCUMENTS

4,277,835  7/1981  Guzziera et al. .................... 395/116
4,989,163  1/1991  Kawamata et al. .................. 395/112

Primary Examiner—Arthur G. Evans
Attorney, Agent, or Firm—Oliff & Berridge

[57] ABSTRACT

A printing control apparatus having a semiconductor storage device of a reduced capacity allows an inexpensive printer to provide large-sized, high-resolution and high-quality printout. The apparatus comprises a band buffer and a page buffer. The band buffer formed in a semiconductor storage device develops therein part of print bit image data. The page memory formed in an external storage device stores one page of print bit image data. With incoming print bit image data developed in the band buffer, the developed print bit image data are transferred from the band buffer to the page memory for printout.

19 Claims, 7 Drawing Sheets

PRINTING CONTROL APPARATUS

This is a Continuation of application Ser. No. 07/997,091 filed Dec. 29, 1992, now abandoned.

BACKGROUND OF THE INVENTION

1. Field of the Invention

The present invention relates to a printing control apparatus and, more particularly, to an improved printing control apparatus that allows a printer to develop data prepared by a computer or like equipment as bit image data.

2. Description of Related Art

Some printers conventionally utilize a page memory allocated in a semiconductor storage device of the printing control apparatus attached thereto, the page memory having a capacity of one-page bit image data to be printed. Print command data such as bit image data, character codes and other data sent from an external computer or the like are developed as print bit image data in the page memory. After such data development, the print station of the printer is started. The developed print bit image data are then output to the print station for one-page printing.

However, recent improvements in the resolution and image quality of printers have tremendously boosted the amount of print bit image data to be printed per page. This trend has not only increased the prices of the printers because of their more expensive semiconductor storage devices incorporated, it has also produced a number of problems including higher power dissipation, higher electric capacity required to drive the semiconductor device and a limit to the amount of data handled by a CPU. These constraints have become so restrictive that some printers of high performance specifications are almost impossible to build at a reasonable cost. In any case, semiconductor storage devices are required to be larger than ever in capacity to execute large amounts of print output.

For example, A4-size printout by conventional monochromatic laser printers generally requires one-bit data per pixel. When their resolution is about 12 pixel/mm, such laser printers need to have a semiconductor storage device with a capacity of about one megabyte in order to retain one A4 page of bit image data. Where printing requirements are dramatically raised, e.g., where the output size is A0 and the resolution is 12 pixel/mm, with 16.70 million colors (24 bits/pixel: yellow 8 bits, magenta 8 bits, cyan 8 bits; or 36 bits/pixel: yellow 8 bits, magenta 8 bits, cyan 8 bits, black 8 bits) assigned per pixel, a memory capacity of at least 500 megabytes is required to accommodate just one page of print bit image data. The memory requirement has led to a drastic hike in equipment cost, making it virtually impossible to build economically feasible printers.

SUMMARY OF THE INVENTION

It is therefore an object of the present invention to provide a printing control apparatus that allows an inexpensive printer with its semiconductor storage device of a significantly reduced capacity to effect large-sized, high-resolution and high-quality printout.

To achieve the above and other objects, a printing control apparatus according to the present invention comprises receiving means for receiving print command data from external equipment; converting means for converting the print command data to print bit image data which define the density of each of a plurality of pixels arranged in longitudinal and transverse directions; a band buffer formed in a semiconductor storage device having a capacity for storing only a part of one page of print bit image data converted by the converting means; developing means for developing the part of one page of print bit image data converted by the converting means in the band buffer; a page memory formed in an external storage device having a capacity for storing at least one page of print bit image data; transferring means for transferring the part of one page of print bit image data developed in the band buffer to the page memory; and printing means for printing an image based on the one page of print bit image data stored in the page memory onto a printing medium.

In operation, the printing control apparatus first converts the incoming print command data into print bit image data. The semiconductor storage device includes the band buffer in which a predetermined amount of print bit image data are developed at a high speed. The external storage device comprises the page memory accommodating one print page of print bit image data. The page memory is made of a plurality of bands, each band accommodating the predetermined amount of print bit image data for the band buffer. In this setup, the print command data are converted to print bit image data. If the print bit image data for a given band have already been developed and stored in the page memory, the print bit image data are transferred from the page memory to the band buffer. Then the converted print bit image data are developed at a high speed in the band buffer. The print bit image data developed in the band buffer are transferred to the page memory when it becomes necessary to develop print bit image data for another band. The already developed and stored print bit image data for the new band are then transferred from the page memory to the band buffer. Such data transfer is carried out a plurality of times until the page memory accepts one print page of print bit image data. After one page of print command data are converted into the print bit image data, the print bit image data now held in the page memory are output consecutively to a print station for one-page hard copy printout.

These and other objects, features and advantages of the invention will become more apparent upon a reading of the following description and appended drawings.

DETAILED DESCRIPTION OF PREFERRED EMBODIMENTS

Figure 1:
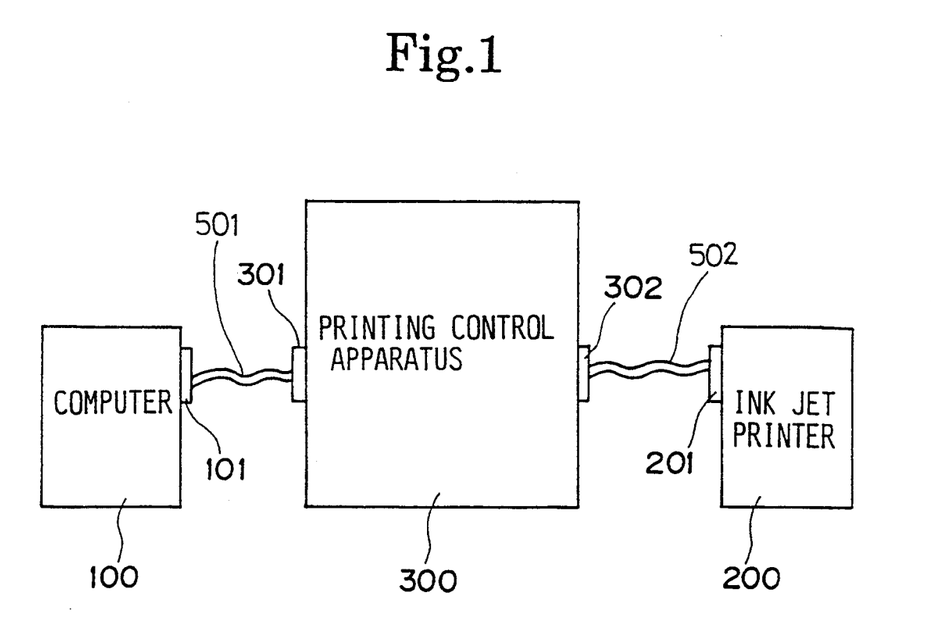
FIG. 1 is a schematic view showing how a printing control apparatus embodying the present invention is connected illustratively to external equipment.

A preferred embodiment of the present invention will now be described with reference to the accompanying drawings. FIG. 1 schematically shows a printing control apparatus 300 that embodies the present invention, the embodiment being connected illustratively to external equipment.

As shown in FIG. 1, a computer 100 and the printing control apparatus 300 are interconnected via a first cable 501. The first cable 501 is coupled to an external connector 101 of the computer 100 and to a first interface connector 301 of the printing control apparatus 300. The cable 501 carries print instructions between the computer 100 and the print control apparatus 300. The apparatus 300 is also connected with an ink jet printer 200 via a second cable 502. The second cable 502 is coupled to a second interface connector 302 of the apparatus 300 and to an interface connector 201 of the printer 200. The cable 502 carries band image data and control commands from the printing control apparatus 300 to the ink jet printer 200.

Figure 2:
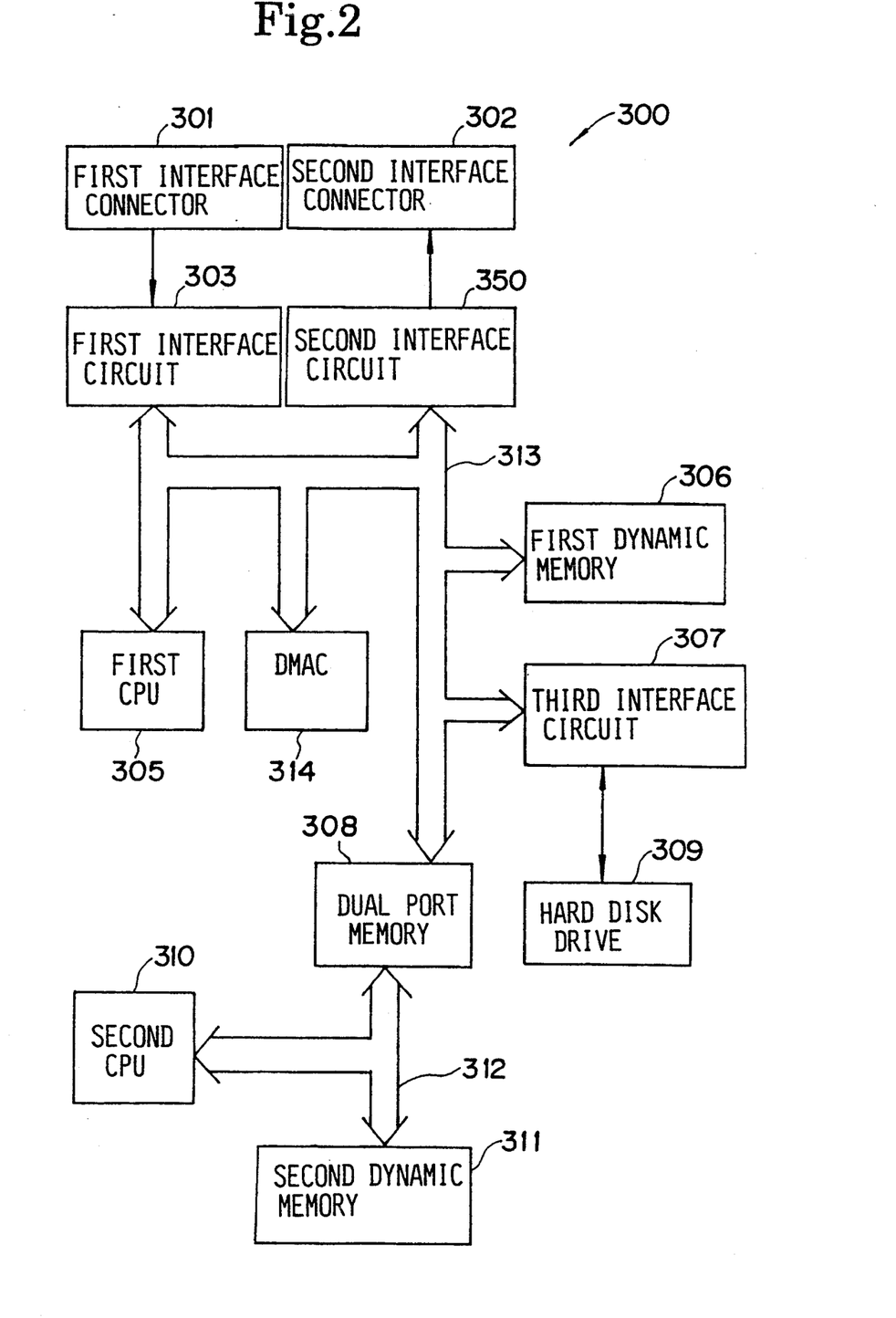
FIG. 2 is a block diagram of the embodiment of FIG. 1.

The construction of the printing control apparatus 300 will now be described in more detail with reference to FIG. 2. In FIG. 2, the first interface connector 301 for receiving data from the computer 100 is connected to a first interface circuit 303 that accepts the received data. Likewise, the second interface connector 302 is connected to a second interface circuit 350 that transmits print data to the outside. The other end of each of the two interface circuits is coupled to a first bus 313 that permits data exchanges between the interface circuits and a first CPU 305. The first bus 313 is also connected to a first dynamic memory 306, a third interface circuit 307, one port of a dual port memory 308 and a DMAC (Direct Memory Access Circuit) 314. The first dynamic memory 306 accumulates data. The third interface circuit 307 is adapted for interfaces with a hard disk drive 309, i.e., an external storage device. The dual port memory 308 has two ports that permit concurrent access to the same memory cell, the memory serving to communicate with a second CPU 310, to be described later. The DMAC 314 effects direct memory transfer between the devices involved. A second bus 312 of the second CPU 310 is connected to the other port of the dual port memory 308 and to a second dynamic memory 311, i.e., a semiconductor storage device for accumulating data.

Figure 5:
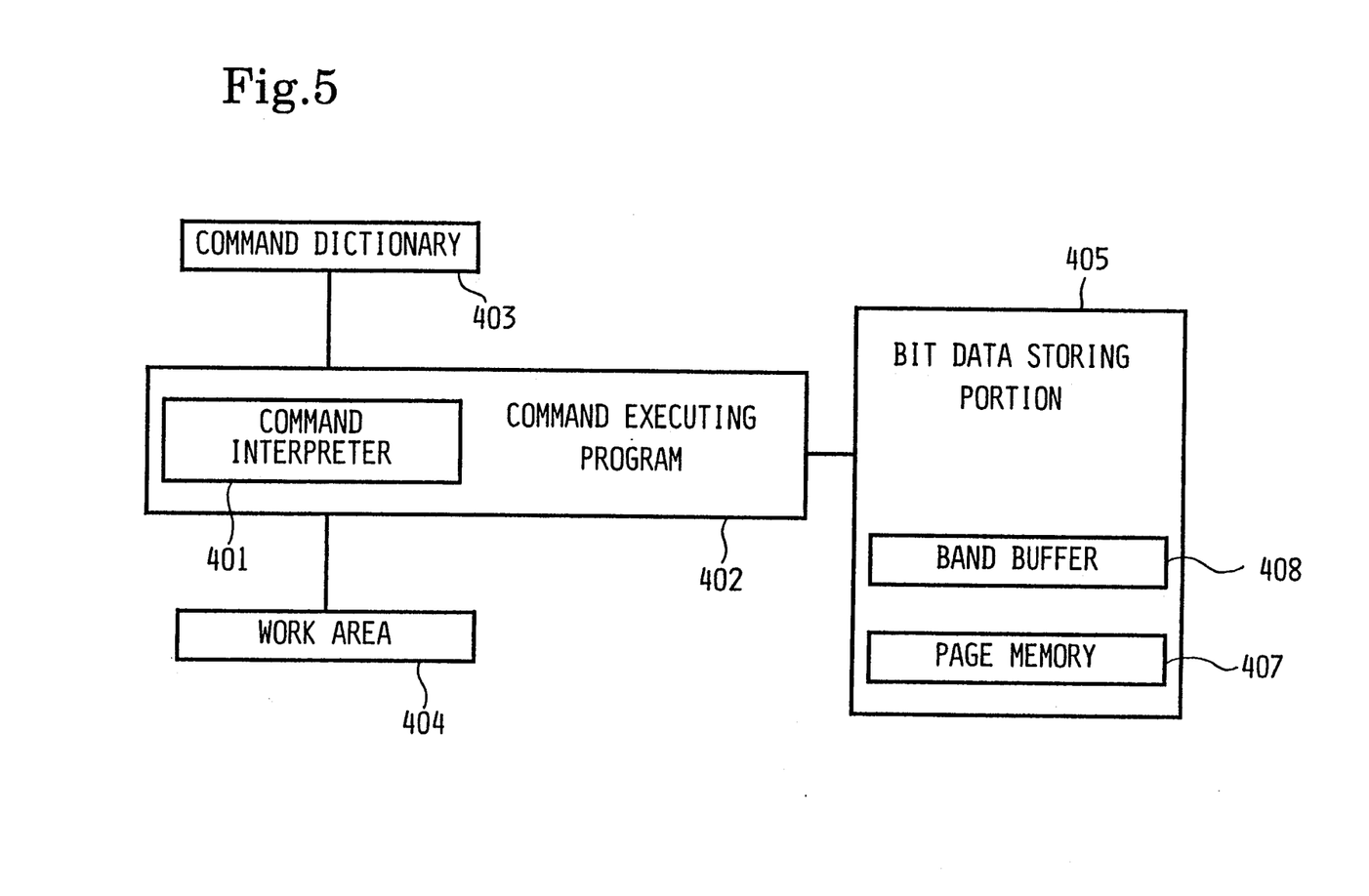
FIG. 5 is a functional block diagram showing procedures whereby the embodiment interprets commands, converts incoming print command data into print bit image data, stores the print bit image data into a band buffer and a page memory according to the respective roles they are to play.

The hard disk drive 309, i.e., the external storage device, has a page memory capable of accommodating one page of print bit image data. The hard disk drive 309 contains such programs as a command interpreter 401, a command executing program 402, and a command dictionary 403, as illustrated in FIG. 5. These programs are transferred to the second dynamic memory 311 upon activation of the printing control apparatus 300. FIG. 2 omits various control signals such as Address Bus and Chip Select which are used in practice.

Figure 3:
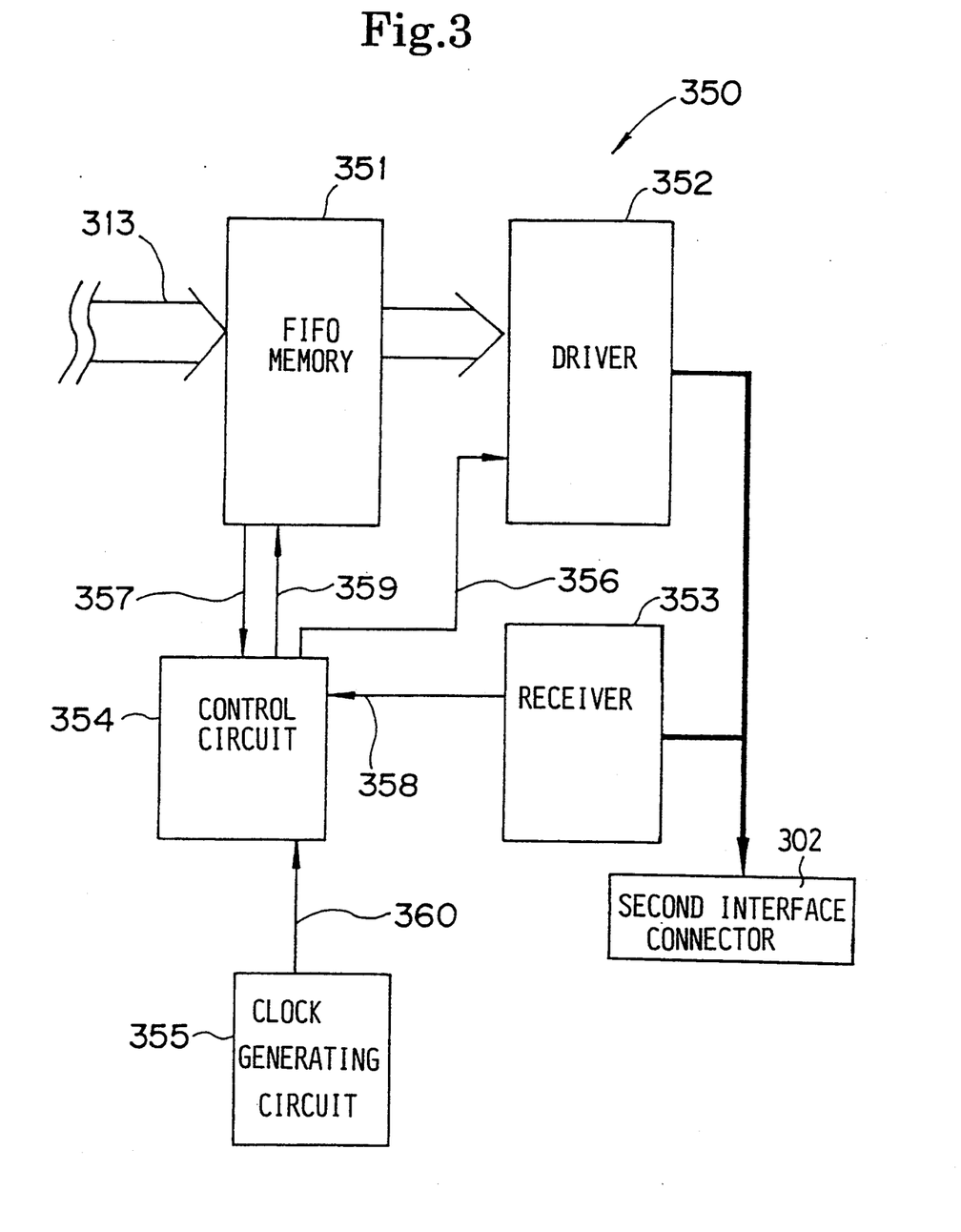
FIG. 3 is a block diagram of an interface control circuit included in the embodiment.

The second interface circuit 350 will now be described in detail with reference to FIG. 3. As shown in FIG. 3, the data input end of a first-in first-out (FIFO) memory 351 is connected to the first bus 313. Over the bus 313, the memory 351 accepts data from the first CPU 305 and other parts. The data output end of the FIFO memory 351 is connected to a driver 352 for outputting data to the second interface connector 302. A receiver 353 is provided to forward a ready signal 358 from the second interface connector 302 on to a control circuit 354. The control circuit 354 generates a read signal 359 directed to the FIFO memory 351 and a data clock signal 356 destined to the second interface connector 302 through the driver 352. The timing of the control circuit 354 is controlled by a clock signal 360 generated by a clock generating circuit 355. An empty flag signal 357 of the FIFO memory 351 is input to the control circuit 354.

Figure 4:
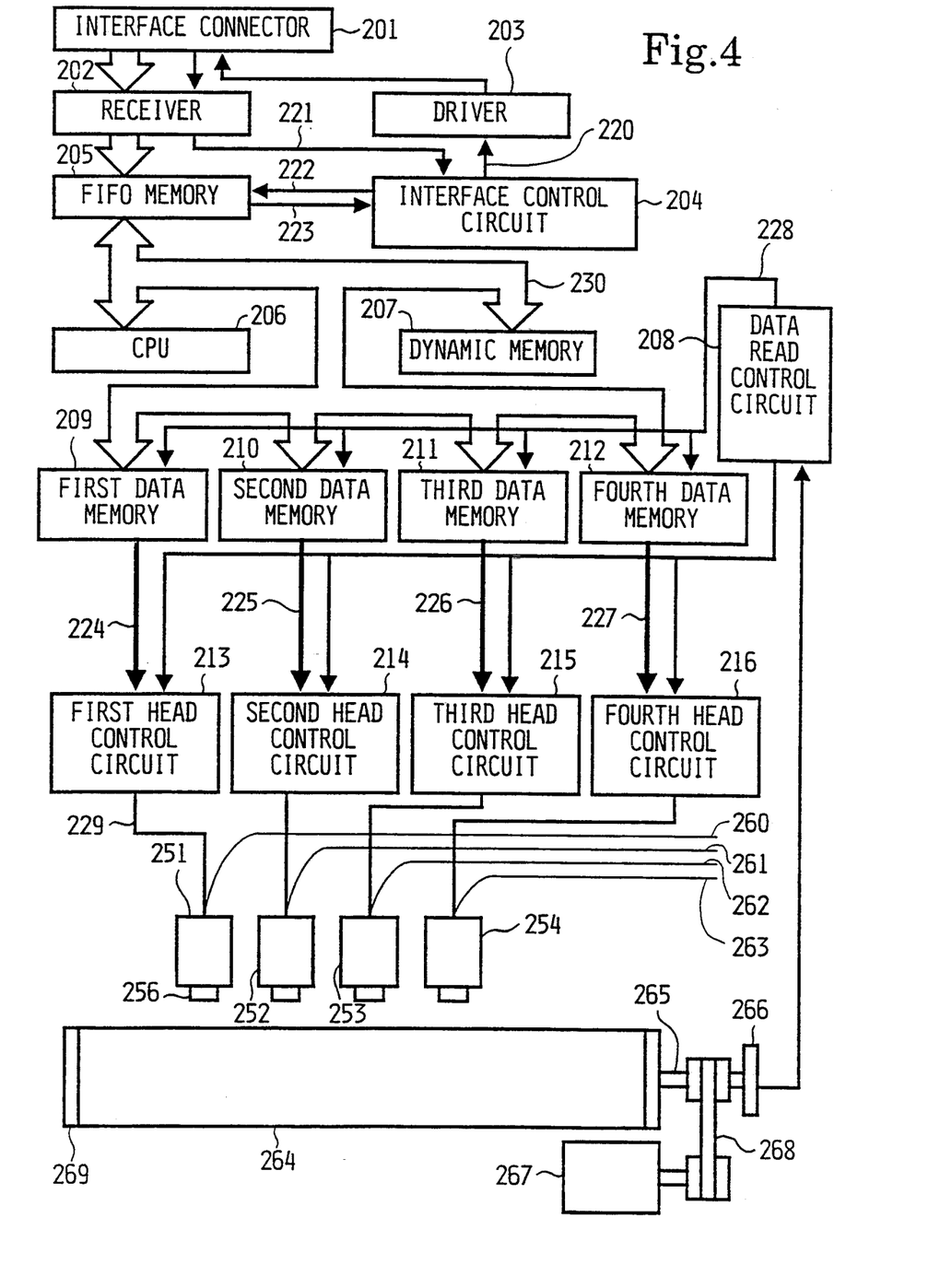
FIG. 4 is an internal block diagram of an ink jet printer used in conjunction with the embodiment.

The construction of an example ink jet printer 200 for use with the printing control apparatus 300 will now be described in detail with reference to FIG. 4. As depicted in FIG. 4, the interface connector 201 is connected to a receiver 202 that forwards the input data and a data clock signal 221 to the data input end of an FIFO memory 205 and to an interface control circuit 204 respectively. The interface connector 201 is also coupled to a driver 203 that outputs a ready signal 220 generated by the interface control circuit 204. A full flag signal 223 of the FIFO memory 205 is sent to the interface control circuit 204 that in turn prevents the FIFO memory 205 from overflowing. A write signal 222 is sent from the interface control circuit 204 to the FIFO memory 205 to write data to the latter.

The data output end of the FIFO memory 205 is coupled to a bus 230 so that a CPU 206 may read data from the memory. The bus 230 is connected to a dynamic memory 207 for data storage which permits data exchanges between the respective parts. The bus 230 is also connected to a first data memory 209, a second data memory 210, a third data memory 211 and a fourth data memory 212, all for storing print bit image data to be described later. The data output end of the first data memory 209 is connected to a first head control circuit 213 in order to send print data 224 to the latter. The reading of data from the first data memory 209 is controlled by a read signal 228 generated by a data read control circuit 208.

The first head control circuit 213 sends a head control signal 229 to an ink jet head 251 for control of ink jet quantity from nozzles 256. The ink jet head 251 is connected with a pipe 260 through which to supply ink from an ink pump, not shown. The second through the fourth data memories 210 through 212 are also furnished and connected in the same manner as the first data memory 209 to print heads 252–254, respectively. Ink jet heads 251 through 254 are supplied illustratively with ink in four colors (black, yellow, magenta and cyan) through pipes 260 to 263, respectively.

Opposite to the four ink jet heads 251 through 254, a drum 269 wound with paper 264 is rotatably installed around a shaft 265. The shaft 265 is equipped with an encoder 266 capable of sending a revolution timing signal to the data read control circuit 208. A belt 268 is engaged around the shaft 265 so as to transmit the torque of a motor 267 to the shaft. The four ink jet heads 251 through 254 are mounted on a single bed, not shown. The ink jet head assembly is integrally movable in the axial direction of the drum 269.

How the printing control apparatus 300 of the above-described construction works will now be described with reference to FIGS. 1 through 7.

The first CPU 305 (see FIG. 2) receives a group of print command data from the computer 100, and stores the print command data group in the hard disk drive 309. When all the print command data from the computer 100 (see FIG. 1) have thus been input, the first CPU 305 writes to the dual port memory 308 an instruction telling the second CPU 310 to interpret the print command data group. On receiving the instruction, the second CPU 310 writes to the dual port memory 308 an instruction telling the first CPU 305 to read the print command data group from the hard disk drive 309 and write the print command data group to the memory 308. With the print command data as a group written in the dual port memory 308, the second CPU 310 reads them from the memory 308 for interpretation. The result of the interpretation is stored in the second dynamic memory 311.

Figure 6:
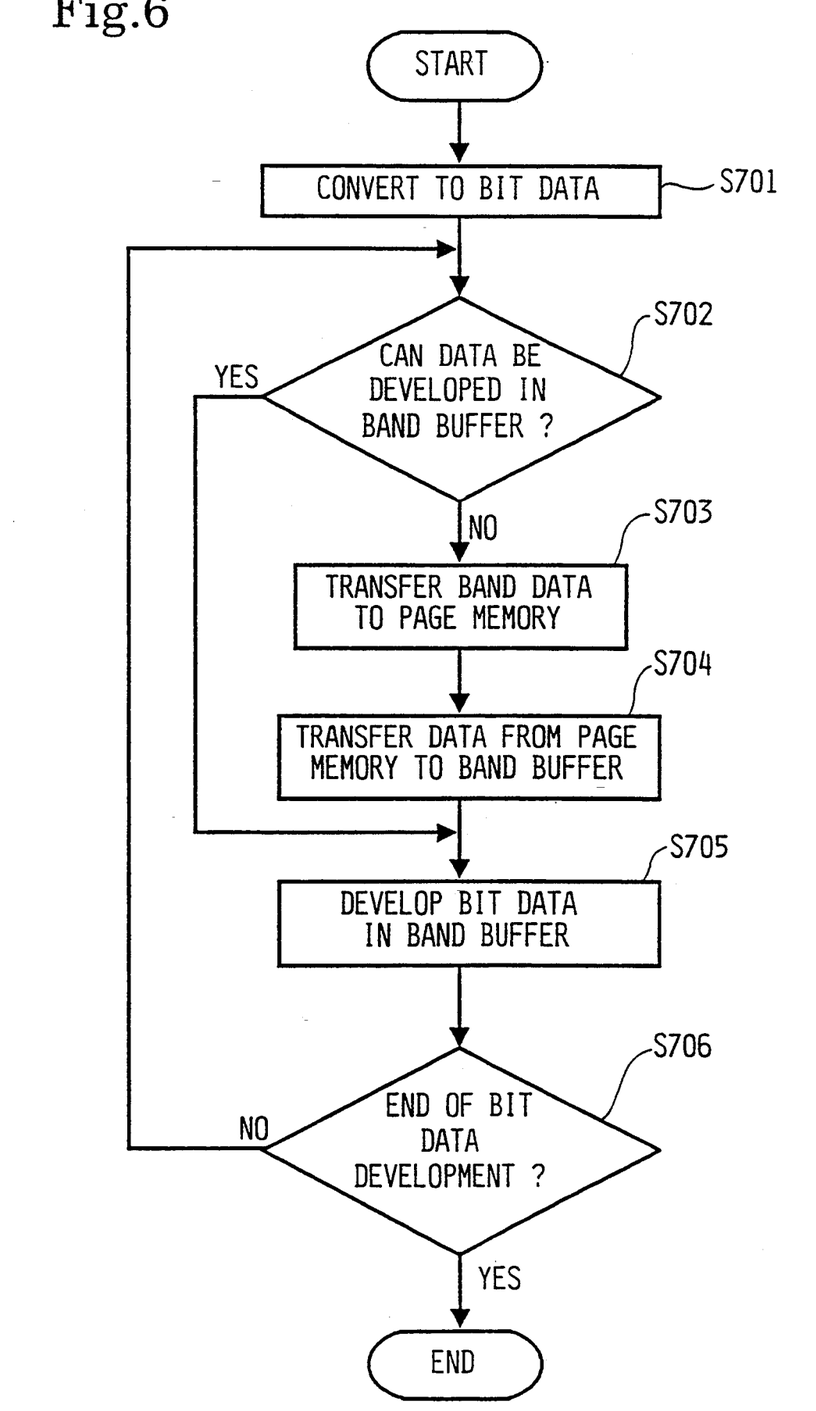
FIG. 6 is a flowchart outlining the steps in which the embodiment stores the print bit image data.

The procedure of the command interpretation outlined above will now be described in more detail with reference to FIGS. 5 through 7. FIG. 5 shows how functional blocks of the embodiment interpret commands and develop print data.

In FIG. 5, the command interpreter 401, command executing program 402, and command dictionary 403 are contained in the hard disk drive 309. These programs are transferred to the second dynamic memory 311 (see FIG. 2) upon activation of the printing control apparatus 300. In the second dynamic memory 311, the command interpreter 401, command executing program 402, command dictionary 403 and print data developing program 406 are executed consecutively by the second CPU 310. The group of print command data to be interpreted includes vector data and input bit image data. Vector data represent the coordinates of figures such as straight lines and circles, while input bit image data are digitized data about images formed by an image scanner or the like scanning photos or similar image-bearing objects. The print command data group written to the dual port memory 308 is first separated into individual print command data by the command interpreter 401. The command dictionary 403 checks each print command data to see if it is valid print command data. The command executing program 402 converts vector data into bit image data using a work area 404 of the second dynamic memory 311 as a temporary buffer. The command executing program also converts input bit image data into print bit image data capable of printing by the ink jet printer 200. After conversion, the print bit image data are stored in a bit data storing portion 405.

Figure 7A:
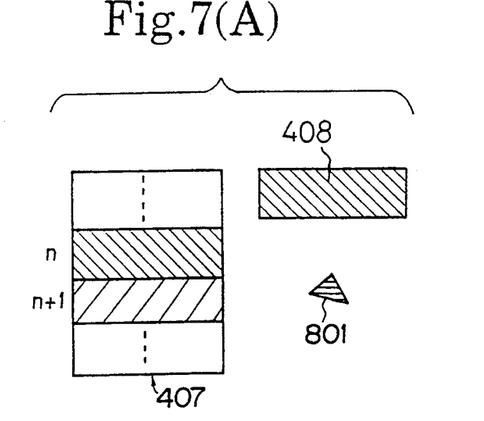
FIGS. 7A–F are a set of schematic views depicting how a bit image data storing portion of the embodiment develops print bit image data.
Figure 7B:
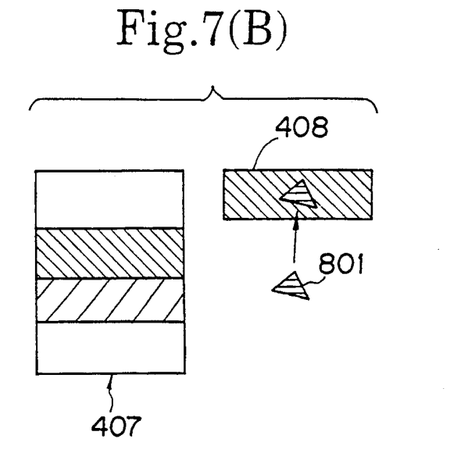
Figure 7C:
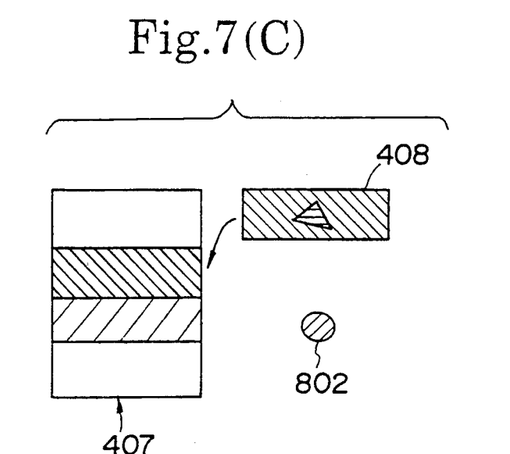
Figure 7D:
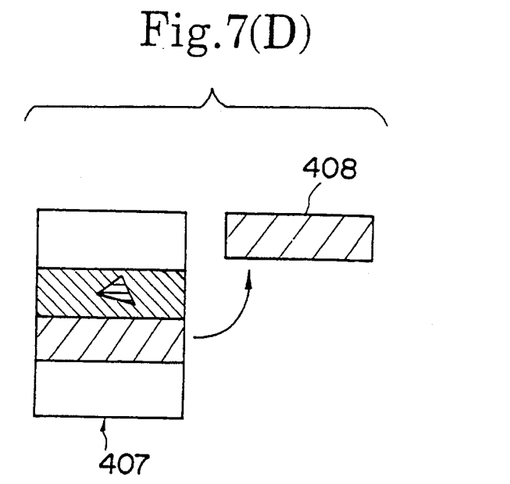
Figure 7E:
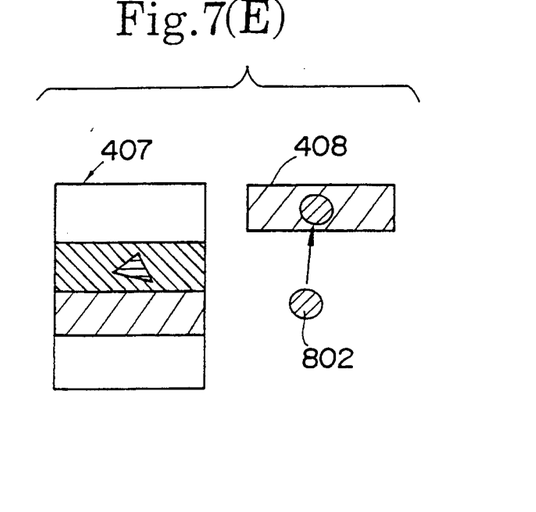
Figure 7F:
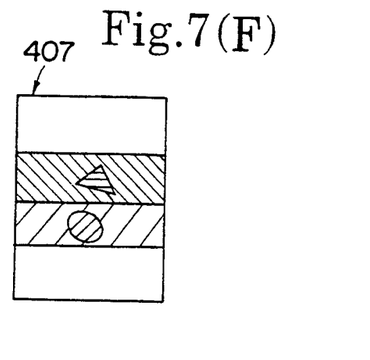

The bit data storing portion 405 comprises a band buffer 408 in the second dynamic memory 311 and a page memory 407 in the hard disk drive 309, which is the external storage device. The page memory 407 has a capacity large enough to accommodate one print page of print bit image data. The page memory 407 stores print bit image data that were converted from print command data by the command executing program 402, thereby forming one print page of image data in terms of print bit image data. As shown in FIG. 7 (A), the band buffer 408 is an area with a storage capacity commensurate with a predetermined portion (called a band) of the page memory 407, the buffer accommodating bit image data by the amount of a single band. The band buffer 408 holds at any point in time the print bit image data of a given band in the page memory 407 if print bit image data have been converted, developed and stored in the page memory.

The print bit image data, after conversion by the command executing program 402 from print command data, are developed temporarily in the band buffer 408 according to the procedure that will be explained below. From the band buffer 408, the print bit image data are moved and stored into the page memory 407 in which one print page of image data is formed.

How the print bit image data are stored will now be described with reference to the flowchart of FIG. 6. In step S701 of FIG. 6, the command executing program 402 converts print command data into print bit image data. The print bit image data include X and Y coordinate values representing a position of the bit image in an area of one page. In step S702, a check is made to see if converted print bit image data may be developed in the band buffer 408. The check is carried out by determining whether the Y coordinate range of the converted print bit image data is included in the Y coordinate range of the band that was read into the band buffer 408. If the determination is negative, the development of the data is impossible. Therefore, one band of print bit image data stored in the band buffer 408 is moved therefrom to the page memory 407 as band data in step S703. In step S704, the print bit image data for the band which has the Y coordinate range including the Y coordinate range of the converted print bit image data are read from the page memory 407 to the band buffer 408. In step S705, the converted print bit image data are stored into the band buffer 408. If the determination in step S702 is affirmative, the development of the data is possible, and step S705 is reached in which the converted print bit image data are stored into the band buffer 408.

In step S706, a check is made to see if all the print bit image data converted by the command executing program 402 have been stored in the band buffer 408. If all print bit image data are found to have been stored in the band buffer 408, the processing comes to an end. If any part of the converted print bit image data is yet to be stored in the band buffer 408, step S702 is reached for the processing to continue.

How data are stored in the bit data storing portion 405 will now be described with reference to FIG. 7. As shown in FIG. 7 (A), the band buffer 408 contains the band data corresponding to a band n of the page memory 407. When the command executing program 402 converts print command data into bit image data 801 to be developed in the band n, the print bit image data 801 are developed unmodified in the band buffer 408, as depicted in FIG. 7 (B). When the command executing program 402 next converts print command data into print bit image data 802 to be developed in the band n+1, the band data of the band buffer 408 are transferred to the band n of the page memory 407, as shown in FIG. 7 (C). Thereafter, as illustrated in FIG. 7 (D), the band data of the band n+1 in the page memory 407 are transferred to the band buffer 480. As shown in FIG. 7 (E), the converted print bit image data 802 are developed in the band buffer 408. Likewise, as depicted in FIG. 7 (F), the band data of the band buffer 408 are transferred to the band n+1 of the page memory 407. This results in the print bit image data 801 having been transferred to the band n of the page memory 407 and the print bit image data 802 to the band n+1.

Generally, the cost per bit of data storage of hard disk drives is about 1/100 of that of semiconductor memory devices. When the page memory requiring a large capacity is provided on a hard disk drive and not in a semiconductor memory device, the printing control apparatus for use therewith is manufactured at a significantly reduced cost. Where the band buffer 408 is implemented in the form of a semiconductor memory device, the high-speed semiconductor memory serves for data development in the band buffer 408 while the low-speed hard disk drive 309 containing the page memory is reduced in operation frequency. This minimizes the decrease, attributable to hard disk drive operations, in the operation speed of the printing control apparatus. Thus using the semiconductor memory device and the hard disk drive in combination makes it possible to implement a large-capacity, inexpensive printing control apparatus that affords high-resolution and high-quality hard copy printout without incurring appreciable reductions in processing speed.

When the above-described interpretation process has been completed on all commands, the second CPU 310 gives the dual port memory 308 an instruction designating the start of printout. Upon receipt of that instruction, the first CPU 305 writes to the second interface control circuit 350 the data that serve as a start command for activating the ink jet printer 200. If a ready signal 358 is true, the second interface control circuit 350 reads the start command data from the FIFO memory one byte at a time for output to the second interface connector 302 while simultaneously generating a data clock signal by one pulse at a time. In synchronism with that data clock signal, the interface control circuit 204 in the ink jet printer 200 moves the data into the FIFO memory 205. These operations continue unless and until the FIFO memory 351 in the printing control apparatus 300 becomes empty or the FIFO memory 205 in the ink jet printer 200 becomes full. The interface control circuit 204 notifies the CPU 206 that data are being input to the FIFO memory 205. The CPU 206 reads the data consecutively and, on recognizing the data to be the start command data, causes a mechanism control circuit, not shown, to activate the motor 267 that rotates the drum 269.

The second CPU 310 then tells the first CPU 305 to read the first print bit image data. The first CPU 305 (see FIG. 2) stores the developed print bit image data into the first dynamic memory 306 and tells the DMAC 314 to write the data to the second interface circuit 350. The minimum capacity required for the first dynamic memory 306 is one raster of print bit image data. This is a drastic reduction in the necessary storage capacity compared with the case where one print page of developed data is to be retained. When the FIFO memory 351 becomes full, the DMAC 314 interrupts its write operation; when the FIFO memory 351 becomes empty, the DMAC 314 resumes its write operation. When the DMAC 314 writes print bit image data to the FIFO memory 351, the written data are sent to the ink jet printer 200 in the manner described in connection with the issuance of the start command. The CPU 206 stores the print bit image data temporarily in the dynamic memory 207. Of the print bit image data, the data component representing the color of cyan is stored by the CPU 206 into the data memory 212 one raster portion at a time. After storage, the CPU 206 gives the data read control circuit 208 an instruction designating the printout of one raster of data.

On receiving that instruction, the data read control circuit 208 in synchronism with the output signal of the encoder 266 sends the contents of the data memory 212 to a fourth head control circuit 216. Based on the data received, the fourth head control circuit 216 determines the amount of head drive based on density represented by the data and drives the head 254 accordingly. The head 254 jets onto the paper 264 the amount of ink corresponding to the amount of head drive. The squirt of ink prints a one-raster image portion in cyan on the paper 264 around the drum 269. The CPU 206 moves the head by one raster portion in the axial direction. The above series of operations is then carried out for the next one-raster image portion. When the head 253 comes to the initial cyan raster position, the same process is repeated using the magenta and cyan data. If necessary data are not found in the dynamic memory 207, the CPU 206 waits for the data to be input.

The above operations are also repeated for the colors of yellow and black. Towards the end of print data, raster printout is stopped consecutively starting from cyan. This provides full-color printout on the paper 264. At this point, the capacity required for the dynamic memory 207 in the ink jet printer 200 equals the sum of memory capacities for printing of the spacing between the heads 254 and 251. In other words, the same printout is available with a drastically reduced semiconductor memory capacity compared with the case where a one-page memory is to be provided in the semiconductor memory device.

As described, the printing control apparatus according to the present invention has its page memory furnished in an external storage device. This drastically reduces the capacity required for the semiconductor storage device incorporated in the apparatus conventionally for page memory purposes. Instead, the high-speed semiconductor storage device comprises a band buffer whose capacity corresponds to only one band of page memory. The scheme permits high-speed development of print bit image data by compensating for the relatively low operation speed characteristic of the external storage device. Thus, the printing control apparatus according to the present invention makes it possible to provide an inexpensive printer that affords high-resolution and high-quality hard copy printout at a high speed.

Although the description above contains many specifics, these should not be construed as limiting the scope of the invention but as merely providing illustrations of the presently preferred embodiment of this invention. For example, the printer may be a sublimation-type thermal printer instead of the ink jet type. The hard disk drive may be replaced with a magneto-optic disk drive or with a tape drive unit.

Thus, the scope of the invention should be determined by the appended claims and their legal equivalents, rather than by the examples given.

What is claimed is:

1. A printing control apparatus for use with a computer, a printer and an external storage device having a page buffer, comprising:

memory means for holding a current band of print bit image data for the page buffer, a page to be printed comprising a plurality of bands, wherein each band contains a plurality of adjacent and complete rows of print bit image data;

first interface means for receiving print command data from the computer;

second interface means for sending print bit image data to the printer;

third interface means for sending and receiving print command data and print bit image data to and from the external storage device; and converting means coupled between said memory means and said first, second and third interface means, said converting means comprising:

developing means for developing in said memory means the print command data received from the computer into print bit image data;

determining means for determining whether a current print bit image data developed by said developing means belongs in the current band;

switching means for storing the current band into the page buffer and for retrieving into said memory means a new band as the current band when said determining means determines that the current print bit image data belongs in the new band;

combining means for combining the current print bit image data and the bit image data in the current band; and sending means for sending the print bit image data from the page buffer to said second interface means after developing all of the print command data.

2. The printing control apparatus of claim 1, wherein said converting means further comprises:

first control means for transmitting data between said first, second and third interface means and instructing conversion of print command data and development of print bit image data;

second control means for developing the print command data into print bit image data by said developing means and combining the print image data in said band buffer by said combining means, said second control means being instructed by said first control means; and a dual port memory coupled between said first and second control means for storing print bit image data from the external storage device received through said third interface means for development by said second control means, wherein said memory means stores the current band of print bit image data from said dual port memory read by said second control means.

3. The printing control apparatus of claim 1, wherein said determining means includes comparison means for comparing a Y coordinate range of the converted print bit image data with a Y coordinate range of the current band stored in said memory means.

4. The printing control apparatus of claim 2, wherein said converting means further comprises an accumulating dynamic memory for accumulating print bit image data developed by said second control means and a direct memory transfer means for transferring print bit image data in said accumulating dynamic memory to said second interface means.

5. The printing control apparatus of claim 4, wherein said second interface means comprises a first in/first out memory for accepting print bit image data from said direct memory transfer means.

6. The printing control apparatus of claim 1, wherein said second interface means comprises a first in/first out memory for accepting print bit image data from said converting means.

7. The printing control apparatus of claim 6, wherein said second interface means further comprises a signal generating means for generating a data clock signal from said first in/first out memory to control sending print bit image data to the printer.

8. A printing control assembly comprising:
external equipment;
a printer having a memory;
an external large capacity memory device having a page buffer for storing one page of print bit image data, the page buffer being divided into a plurality of bands; and a printing control device coupled for communication between said external equipment, said printer and said external memory device, said printing control device comprising:

receiving means for receiving print command data from said external equipment;

converting means for converting the print command data into print bit image data;

a band buffer for holding a current band of print bit image data;

determining means for determining whether the print bit image data converted by said converting means belongs in the current band held in the band buffer;

switching means for storing the current band in the page buffer of said external memory device and for retrieving into the band buffer a new band as the current band when said determining means determines that the print bit image data converted by said converting means belongs in the new band;

developing means for developing the print bit image data in said band buffer with the print bit image data converted by said converting means;

transferring means for transferring the print bit image data from said band buffer to said page buffer in said external memory device; and print instructing means for controlling the transfer of the print bit image data to said memory in said printer after converting all of the print command data.

9. The printing control assembly of claim 8, wherein said band buffer is a semiconductor memory device and stores one band of print bit image data at a time.

10. The printing control assembly of claim 9, wherein said transferring means also transfers a band of print bit image data from said page buffer to said band buffer.

11. The printing control assembly of claim 8, wherein said determining means includes comparison means for comparing a Y coordinate range of the print bit image data in said band buffer with a Y coordinate range of the band in said page buffer.

12. The printing control assembly of claim 8, wherein said print instructing means includes a first in/first out memory for storing print bit image data from said page buffer for transfer of print bit image data one byte at a time to said memory in said printer.

13. The printing control assembly of claim 12, wherein said print instructing means further includes a signal generating means for generating a data clock signal to synchronize the transfer of print bit image data from said first in/first out memory to said memory in said printer.

14. The printing control assembly of claim 8, wherein said printing control device further includes a dual port memory for storing print command data and print bit image data from said page buffer for said converting means and for said developing means to read.

15. A printing control apparatus for use with external equipment, a printer and an external storage device having a page buffer with a storage capacity of at least one page of print bit image data, comprising:

memory means for holding a current band of print bit image data for the page buffer, a page to be printed comprising a plurality of bands;

first interface means for receiving print command data from the external equipment;

second interface means for sending print bit image data to the printer;

third interface means for sending and receiving print command data and print bit image data to and from the page buffer in the external storage device; and converting means coupled between the memory means and said first, second and third interface means for converting the print command data from the external equipment into print bit image data, which define density of each of a plurality of pixels arranged in longitudinal and transverse directions, and for developing print bit image data to send to the page buffer of the external storage device, said converting means comprising:

developing means for developing in the memory means the print command data received from the external equipment into print bit image data;

checking means for checking whether a current print bit image data developed by the developing means belongs in the current band;

switching means for storing the current band in the page buffer of the external storage device and for retrieving into the memory means a new band as the current band when the checking means determines that the print bit image data converted by the converting means belongs in the new band;

combining means for combining the current print bit image data and the bit image data in the current band; and sending means for sending the print bit image data from the page buffer to the second interface means after developing all of the print command data.

16. The printing control apparatus of claim 1, wherein the printer is a color printer.

17. The printing control apparatus of claim 16, wherein the print bit image data has encoded at least three colors.

18. The printing control apparatus of claim 17, wherein the at least three colors includes yellow, magenta, and cyan.

19. The printing control apparatus of claim 18, wherein the at least three colors includes black as a fourth color.

* * * * *